United States Patent
Lei et al.

(10) Patent No.: US 12,323,544 B2
(45) Date of Patent: Jun. 3, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Shuang Lei, Beijing (CN); An Fu, Beijing (CN); Xu Lu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,935

(22) PCT Filed: Nov. 19, 2021

(86) PCT No.: PCT/CN2021/131797
§ 371 (c)(1),
(2) Date: Mar. 23, 2023

(87) PCT Pub. No.: WO2022/183778
PCT Pub. Date: Sep. 9, 2022

(65) Prior Publication Data
US 2023/0370537 A1 Nov. 16, 2023

(30) Foreign Application Priority Data
Mar. 2, 2021 (CN) .......................... 202120452882.0

(51) Int. Cl.
*H04M 1/02* (2006.01)
*G09F 9/30* (2006.01)

(52) U.S. Cl.
CPC ............ *H04M 1/0269* (2022.02); *G09F 9/30* (2013.01); *H04M 2201/38* (2013.01)

(58) Field of Classification Search
CPC ..... G09F 9/30; H04M 1/0269; H04M 1/0268; H04M 2201/38
(Continued)

(56) References Cited

U.S. PATENT DOCUMENTS

| 10,383,239 B2 | 8/2019 | Lee et al. | |
| 2017/0240782 A1* | 8/2017 | Suwa | ...................... G06F 3/044 |

(Continued)

FOREIGN PATENT DOCUMENTS

| CN | 106652803 A | 5/2017 |
| CN | 107067984 A | 8/2017 |

(Continued)

OTHER PUBLICATIONS

International Search Report and Written Opinion mailed on Feb. 24, 2022, in corresponding PCT/CN2021/131797, 9 pages.

*Primary Examiner* — Jimmy H Nguyen
(74) *Attorney, Agent, or Firm* — XSENSUS LLP (57) ABSTRACT

A display panel and display device are provided. The display panel includes a cover plate, padding part and display assembly. The cover plate has a bending part. The padding part is provided at a bending inner side of the bending part. An extension direction of the padding part is consistent with that of the bending part, and a sectional shape of the padding part perpendicular to the extension direction is provided as a structure gradually thickening from both side edges to a centre portion. The padding part has a first curved surface being a cylindrical surface, and the first curved surface is a surface of the padding part away from the cover plate, is concave toward the bending part, and smoothly transits to the cover plate. The display assembly is provided at a side of the first curved surface away from the cover plate.

16 Claims, 5 Drawing Sheets

(58) Field of Classification Search
USPC .................................................. 345/55, 76
See application file for complete search history.

(56) References Cited

U.S. PATENT DOCUMENTS

2018/0368270 A1* 12/2018 Seo ........................... G06F 1/16
2021/0127517 A1*  4/2021 Kim .......................... B32B 7/12

FOREIGN PATENT DOCUMENTS

| | | |
|---|---|---|
| CN | 109003545 A | 12/2018 |
| CN | 109148512 A | 1/2019 |
| CN | 210777598 U | 6/2020 |
| CN | 210836910 U | 6/2020 |
| CN | 111584743 A | 8/2020 |
| CN | 111768707 A | 10/2020 |
| CN | 111785175 A | 10/2020 |
| CN | 111799310 A | 10/2020 |
| CN | 111816063 A | 10/2020 |
| CN | 111833739 A | 10/2020 |
| JP | 2001-154592 A | 6/2001 |
| WO | 2021/164510 A1 | 8/2021 |

* cited by examiner

DISPLAY PANEL AND DISPLAY DEVICE

CROSS-REFERENCE TO RELATED APPLICATION

The present disclosure is a U.S. National Stage of International Application No. PCT/CN2021/131797 filed on Nov. 19, 2021, which claims priority to Chinese patent application No. 202120452882.0, filed on Mar. 2, 2021, entitled "Display Panel and Display Device", the entire contents of each are incorporated herein by reference in their entirety.

TECHNICAL FIELD

The present disclosure relates to the field of display technology, and particularly, to a display panel and a display device including the display panel.

BACKGROUND

At present, mobile phones have become necessities in people's lives, and life, work, communication, entertainment, and the like of people are inseparable from mobile phones. In recent years, a cover plate with a large bending angle has a relatively beautiful appearance, and a product with such cover plate becomes relatively competitive. However, increase in the bending angle of the cover plate increases attaching difficulty of a display substrate, a heat dissipation film and the like, causing problems in which the display substrate may form cracks, bubbles, and edge wrinkles at a bending part, and eventually causing poor display. In addition, an attaching surface with a large bending angle makes the heat dissipation film unsuitable for firm attachment at the bending part, and false attachment and rebound may occur, which causes poor display such as attaching bubbles, stamps and the like.

It should be noted that, the information disclosed in foregoing Background section is only for understanding of the background of the present disclosure, and therefore may contain information that does not constitute the prior art known to those ordinary skilled in the art.

SUMMARY

The present disclosure provides a display panel and a display device including the display panel.

An aspect of the present disclosure provides a display panel, including:
  a cover plate, having a bending part;
  a padding part, provided at a bending inner side of the bending part, wherein an extension direction of the padding part is consistent with an extension direction of the bending part, a sectional shape of the padding part perpendicular to the extension direction is provided as a structure gradually thickening from both side edges to a centre portion, the padding part has a first curved surface, the first curved surface is a cylindrical surface, the first curved surface is a surface of the padding part away from the cover plate, the first curved surface is concave toward the bending part, and the first curved surface smoothly transits to the cover plate; and
  a display assembly, provided at a side of the first curved surface away from the cover plate.

In an exemplary embodiment of the present disclosure, on a cross-section perpendicular to the extension direction, a middle portion of the padding part is provided opposite to a middle portion of the bending part.

In an exemplary embodiment of the present disclosure, a maximum thickness of a middle portion of a cross-section of the padding part perpendicular to the extension direction is greater than or equal to 0.2 millimeters and is less than or equal to 0.5 millimeters, and thicknesses of the cross-section at both side edges are less than or equal to 0.1 millimeters.

In an exemplary embodiment of the present disclosure, a maximum thickness of a middle portion of a cross-section of the padding part perpendicular to the extension direction is greater than 0.1 millimeters and is less than or equal to 0.16 millimeters, and thicknesses of the cross-section at both side edges are less than 0.1 millimeters.

In an exemplary embodiment of the present disclosure, the padding part further has a second curved surface provided opposite to the first curved surface, and the second curved surface is attached onto the bending part.

In an exemplary embodiment of the present disclosure, on a cross-section perpendicular to the extension direction, two ends of a first curve of the padding part on the first curved surface are correspondingly connected to two ends of a second curve of the padding part on the second curved surface, so that the first curved surface and the second curved surface are connected to form two first edge straight lines, and extension directions of the first edge straight lines are consistent with the extension direction of the padding part.

In an exemplary embodiment of the present disclosure, the cover plate further has a planar part and an extended planar part, and the planar part and the extended planar part are smoothly transitionally connected to two opposite sides of the bending part; wherein an orthographic projection of one of the first edge straight lines on the planar part coincides with a first connection line for connecting the planar part and the bending part, or is located within the planar part; and an orthographic projection of the other of the first edge straight lines on the extended planar part coincides with a second connection line for connecting the extended planar part and the bending part, or is located within the extended planar part.

In an exemplary embodiment of the present disclosure, on a cross-section perpendicular to the extension direction, a curvature radius of the first curved surface gradually increases from both side edges to a centre portion of the first curved surface, and a curvature radius of the second curved surface gradually increases from both side edges to a centre portion of the second curved surface.

In an exemplary embodiment of the present disclosure, a material of the padding part is optical clear adhesive (OCA).

In an exemplary embodiment of the present disclosure, the padding part and the cover plate are integrally provided.

In an exemplary embodiment of the present disclosure, the display assembly includes:
  a first adhesive layer, provided at a side of the padding part away from the cover plate;
  a polarizer, provided at a side of the first adhesive layer away from the cover plate;
  a display substrate, provided at a side of the polarizer away from the cover plate; and
  a heat dissipation film, provided at a side of the display substrate away from the cover plate.

In an exemplary embodiment of the present disclosure, a bending angle of the cover plate is greater than or equal to 80°.

Another aspect of the present disclosure provides a display device, including any one of the above display panels.

It should be understood that, the foregoing general description and the following detailed description are exemplary and explanatory only, and cannot restrict the present disclosure.

BRIEF DESCRIPTION OF THE DRAWINGS

The accompanying drawings here, which are incorporated in and constitute a part of the present description, illustrate embodiments consistent with the present disclosure and serve to explain the principles of the present disclosure together with the description. Obviously, the figures in the following description are only some embodiments of the present disclosure, and for those ordinary skilled in the art, other figures may also be obtained from these figures without creative effort.

DETAILED DESCRIPTION

Exemplary embodiments will now be described more fully with reference to the accompanying drawings. However, exemplary embodiments can be implemented in various forms and should not be construed as being limited to the embodiments set forth here; on the contrary, these embodiments are provided so that the present disclosure will be comprehensive and complete, and the concept of exemplary embodiments will be fully conveyed to those skilled in the art. The same reference numerals in the figures represent the same or similar structures, and thus their detailed descriptions will be omitted. Further, the figures are merely schematic illustrations of the present disclosure and are not necessarily drawn to scale.

Although relative terms such as "above" and "below" are used in the present description to describe the relative relationship of one assembly to another assembly as shown, these terms are used in the present description only for convenience of description, for example, according to the direction of examples depicted in the figures. It can be appreciated that, if the device shown is turned upside down, the assembly described as "above" will become the assembly "below". When a structure is "on" another structure, it may mean that the structure is integrally formed on said another structure, or that the structure is "directly" provided on said another structure, or that the structure is "indirectly" provided on said another structure through an additional structure.

The terms "a", "an", "the" and "said" are used to indicate the presence of one or more elements/components/and the like; the terms "comprise" and "include" are used to indicate an open-ended inclusive meaning and to mean that additional elements/components/and the like may be present in addition to listed elements/components/and the like; and the terms "first", "second", "third" and the like are used as references only and are not intended to limit the number of objects thereof.

An embodiment of the present disclosure provides a display panel. As shown in FIGS. 1 to 6, the display panel may include a cover plate 1, a padding part 2 and a display assembly. The cover plate 1 has a bending part 12, the padding part 2 is provided at a bending inner side of the bending part 12, an extension direction of the padding part 2 is consistent with an extension direction of the bending part 12, a sectional shape of the padding part 2 perpendicular to the extension direction is provided as a structure gradually thickening from both side edges to a centre portion, the padding part 2 has a first curved surface 21, the first curved surface 21 is a cylindrical surface, the first curved surface 21 is a surface of the padding part 2 away from the cover plate 1, the first curved surface 21 is concave toward the bending part 12, and on a cross-section perpendicular to the extension direction, the first curved surface 21 smoothly transits to the cover plate 1. The display assembly is provided at a side of the first curved surface 21 away from the cover plate 1.

In the display panel of the present disclosure, the padding part 2 is padded/filled at the bending inner side of the bending part 12 of the cover plate 1, and the sectional shape of the padding part 2 perpendicular to the extension direction is provided as a structure gradually thickening from the both side edges to the centre portion, so that the first curved surface 21 where the padding part 2 is attached to the display assembly is relatively gentle, which is convenient for the attachment of the display assembly, and after the attachment, deficiencies such as cracks, bubbles, edge wrinkles and the like may be not formed at the bending part of the display assembly, therefore poor display may not be caused. Moreover, the heat dissipation film 6 is also easy to be attached firmly at the bending part, and thus false attachment and rebound may not be generated, which may not cause poor display such as attaching bubbles, stamps and the like.

Figure 3:
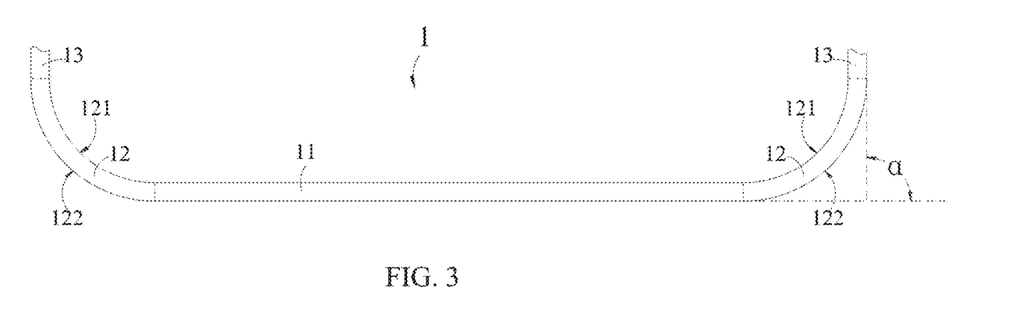
FIG. 3 is a structural schematic view of a cover plate shown in FIG. 1.
Figure 6:
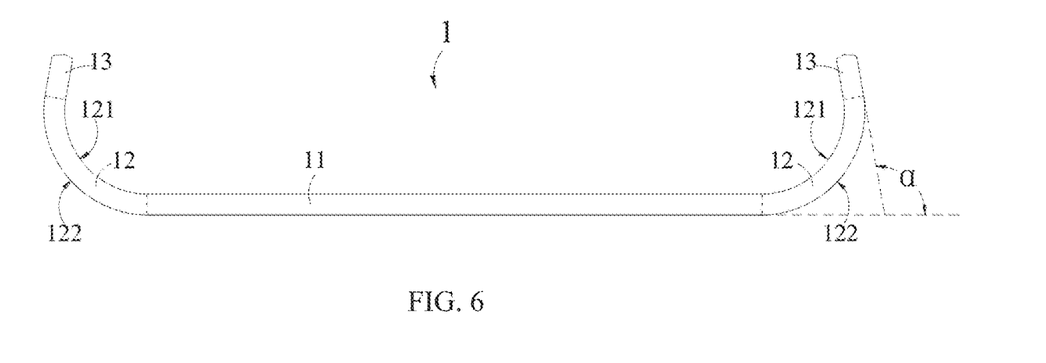
FIG. 6 is a structural schematic view of a cover plate shown in FIG. 4.

In an exemplary embodiment, as shown in FIGS. 3 and 6, the cover plate 1 has a planar part 11, and the planar part 11 may be provided as a rectangle, i.e., the planar part 11 has two long sides and two short sides. Two bending parts 12 are respectively connected to the two long sides of the planar part 11, and the two bending parts 12 are symmetrical to each other, thus the following specific description is made by taking one bending part 12 as example. The extended planar part 13 may also be connected at a side of the bending part 12 away from the planar part 11, and the extended planar part 13 smoothly transits to the bending part 12.

The extension direction of the bending part 12 is consistent with the extension direction of the long side of the planar part 11, i.e., the extension direction of the bending part 12 is the extension direction of the edge of the planar part 11 connected with the bending part 12.

Of course, according to actual needs, one bending part 12 may also be connected at one edge of the planar part 11, or three or four bending parts 12 may be respectively connected at three or four edges of the planar part 11.

The bending part 12 extends along the edge of the planar part 11, the thicknesses of the planar part 11 and the bending part 12 are substantially the same, and the planar part 11 smoothly transits to the bending part 12. The bending angle α may be 80°, 88°, 90°, 110°, 120°, etc. The bending angle α may be an included angle α formed between the extension line of the planar part 11 and the tangent line of the bending part 12 at the side away from the planar part 11. The bending angle α may also an included angle α formed between the extension line of the planar part 11 and the extension line of the extended planar part 13.

The bending part 12 may have a first bending curved surface 121 and a second bending curved surface 122. In an exemplary embodiment, on the cross-section perpendicular to the extension direction, a curvature radius of the first bending curved surface 121 may gradually increase from both side edges of the first bending curved surface 121 connected with the planar part 11 and the extended planar part 13 to the centre portion of the first bending curved surface 121. Similarly, on the cross-section perpendicular to the extension direction, a curvature radius of the second bending curved surface 122 may gradually increase from both sides edges of the second bending curved surface 122 connected with the planar part 11 and the extended planar part 13 to the centre portion of the second bending curved surface 122. Of course, the curvature radius of the first bending curved surface 121 may also gradually decrease from the both sides edges of the first bending curved surface 121 connected with the planar part 11 and the extended planar part 13 to the centre portion of the first bending curved surface 121, and the curvature radius of the second bending curved surface 122 may also be gradually decrease from the both side edges of the second bending curved surface 122 connected with the planar part 11 and the extended planar part 13 to the centre portion of the second bending curved surface 122.

In addition, in another exemplary embodiment of the present disclosure, the first bending curved surface 121 may be provided as a circular cambered surface, so that the curvature radiuses of the first bending curved surface 121 at respective points are the same; and the second bending curved surface 122 may also be provided as a circular cambered surface, so that the curvature radiuses of the second bending curved surface 122 at respective points are the same. Since the thickness of the bending part 12 is substantially uniform, the curvature radius of the second bending curved surface 122 may be greater than the curvature radius of the first bending curved surface 121. The second bending curved surface 122 is located at a side away from the display assembly. On the cross-section perpendicular to the extension direction, the length of a second camber line on the second bending curved surface 122 is greater than the length of a first camber line on the first bending curved surface 121. That is, the first bending curved surface 121 is located at the bending inner side of the bending part 12, and the second bending curved surface 122 is located at the bending outer side of the bending part 12.

Further, the first bending curved surface 121 may be provided as an elliptic cambered surface, a parabolic cambered surface or the like, i.e., the cross-section of the first bending curved surface 121 perpendicular to the extension direction may be an elliptic camber line, a parabola camber line or the like. Similarly, the second bending curved surface 122 may be provided as an elliptic cambered surface, a parabolic cambered surface or the like, i.e., the cross-section of the second bending curved surface 122 perpendicular to the extension direction may be an elliptic camber line, a parabola camber line or the like.

The bending inner side refers to the side of the bending part 12 at which the center of the circle of the first bending curved surface 121 and the center of the circle of the second bending curved surface 122 are located. In the case that the first bending curved surface 121 and the second bending curved surface 122 are provided as elliptic cambered surfaces or parabolic cambered surfaces, the bending inner side may also be the side of the bending part 12 at which a plurality of arc centers of the first bending curved surface 121 and a plurality of arc centers of the second bending curved surface 122 are located. Since an elliptic camber line or a parabola is formed by a plurality of arcs, the arc center is the center of the circle to which the arc belongs. The bending outer side refers to the side opposite to the bending inner side.

The material of the cover plate 1 may be glass, and the cover plate 1 may be formed by thermoplastically bending a plate glass.

The padding part 2 is provided at the bending inner side of the bending part 12. In an exemplary embodiment, the material of the padding part 2 may be optical clear adhesive (OCA). The OCA has a transmittance greater than or equal to 90%, a curing energy less than or equal to 3000 joules, a dielectric constant greater than or equal to 4, and an elasticity modulus greater than or equal to 100 and less than or equal to 150. Of course, in other exemplary embodiments of the present disclosure, the padding part 2 may also include other materials, as long as such material has a transmittance greater than or equal to 90%, a curing energy less than or equal to 3000 joules, a dielectric constant greater than or equal to 4, and an elasticity modulus greater than or equal to 100 and less than or equal to 150.

Figure 2:
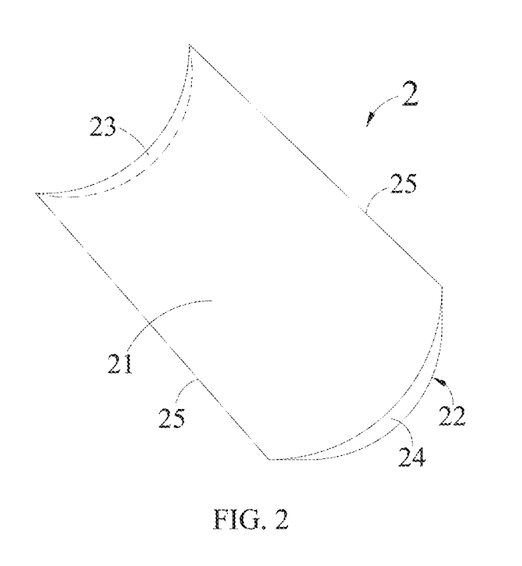
FIG. 2 is a structural schematic perspective view of a padding part shown in FIG. 1
Figure 5:
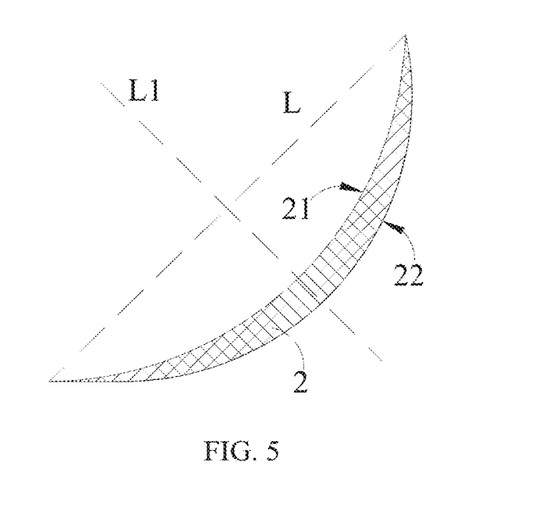
FIG. 5 is a structural schematic view of a cross-section of a padding part parallel to the extension direction shown in FIG. 4.

Referring to FIGS. 2 and 5, the extension direction of the padding part 2 is consistent with the extension direction of the bending part 12, i.e., the padding part 2 extends along the long side of the planar part 11, and the extension length of the padding part 2 is substantially the same as the extension length of the bending part 12. The sectional shape of the padding part 2 perpendicular to the extension direction is provided as a structure gradually thickening from both side edges to the centre portion. Specifically, referring to FIG. 5, the cross-section of the padding part 2 perpendicular to the extension direction is provided as a structure with the thickness gradually increasing as the distance from the reference center line L1 decreases. The reference center line L1 is the center line of the connection line L of the two ends of the padding part 2 on the cross-section perpendicular to the extension direction.

Figure 1:
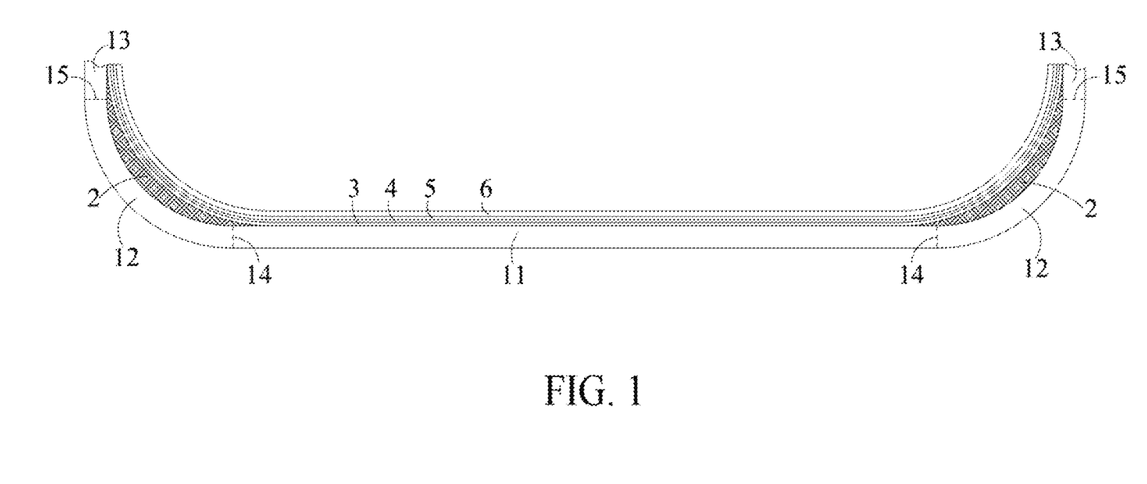
FIG. 1 is a structural schematic view of a display panel according to an exemplary embodiment of the present disclosure.
Figure 4:
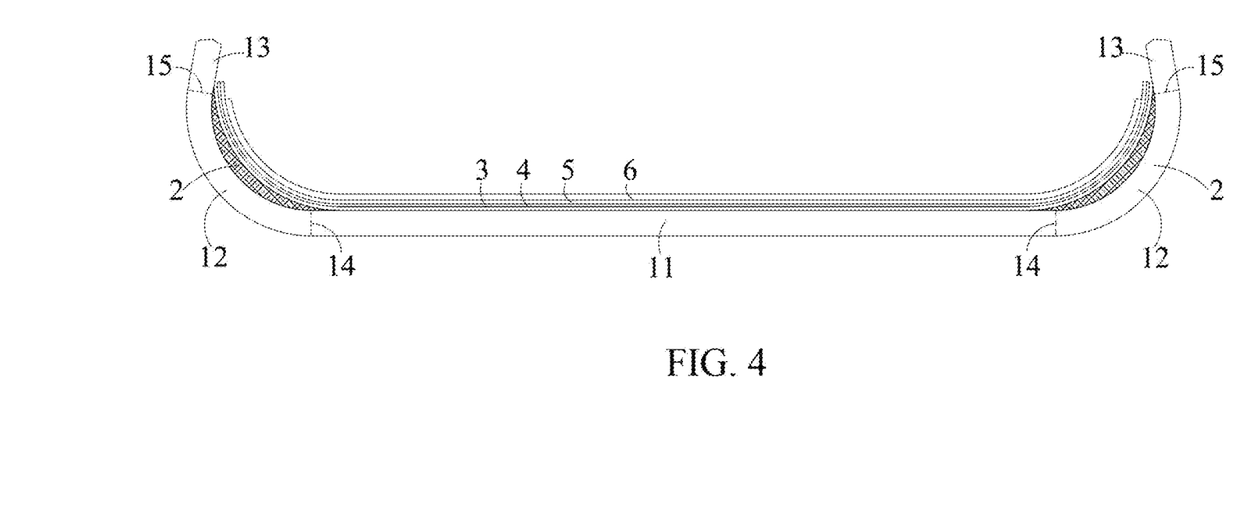
FIG. 4 is a structural schematic view of a display panel according to another exemplary embodiment of the present disclosure.

For example, referring to FIGS. 1 to 2, in the case where the bending angle is about 80° to 90°, the maximum thickness of the middle portion of the cross-section of the padding part 2 perpendicular to the extension direction is greater than 0.1 millimeters and is less than or equal to 0.16 millimeters. Although the first curved surface 21 and the second curved surface 22 are integrally connected at the edge (forming the first edge straight line 25), the thicknesses of the padding part 2 at both side edges are less than 0.1 millimeters due to the limitation of the manufacturing process and the fact that any entity has a certain thickness. Referring to FIGS. 4 to 6, in the case where the bending angle is about 110° to 120°, the maximum thickness of the middle portion of the cross-section of the padding part 2 perpendicular to the extension direction is greater than or equal to 0.2 millimeters and is less than or equal to 0.5 millimeters, and preferably, is greater than or equal to 0.26 millimeters and is less than or equal to 0.46 millimeters. Similarly, the thicknesses of the padding part 2 at the both side edges are less than or equal to 0.1 millimeters due to the limitation of the manufacturing process and the fact that any entity has a certain thickness. Of course, the smaller the thicknesses of the padding part 2 at the both side edges, the better.

The padding part 2 has a first curved surface 21 and a second curved surface 22 oppositely provided. The first curved surface 21 is a cylindrical surface, and the cylindrical surface is a curved surface formed by parallel movement of a straight line along an alignment curve, i.e., the curved surface formed by parallel movement of a moving straight line along an alignment curve. The moving straight line is called the straight generatrix of the cylindrical surface, and the alignment curve is called the directrix of the cylindrical surface. When the directrix is a circle, the resulting cylindrical surface is called a circular cylindrical surface.

The extension direction of the first curved surface 21 is consistent with the extension direction of the bending part 12, and the extension direction of the second curved surface 22 is also consistent with the extension direction of the bending part 12. On the cross-section perpendicular to the extension direction, the curvature radius of the first curved surface 21 gradually increases from both side edges to a centre portion of the first curved surface 21; and the curvature radius of the second curved surface 22 gradually increases from both side edges to a centre portion of the second curved surface 22. Specifically, the curvature radius of the first curved surface 21 increases as the distance from the reference center line L1 decreases; and the curvature radius of the second curved surface 22 increases as the distance from the reference center line L1 decreases. The change in the curvature radius of the second curved surface 22 is not limited to the foregoing description. Since the second curved surface 22 and the first curved surface 121 are attached to each other, it is OK as long as the second curved surface 22 and the first bending curved surface 121 are substantially the same. The change in the curvature radius of the first curved surface 21 is not limited to the foregoing description, and the change in the curvature radius of the first curved surface 21 may be the same as or different from the change in the curvature radius of the second curved surface 22.

In addition, in another exemplary embodiment of the present disclosure, the first curved surface 21 may be a first circular cambered surface, and the curvature radiuses of the first circular cambered surface at respective points are the same. The second curved surface 22 may be a second circular cambered surface, and the curvature radiuses of the second circular cambered surface at respective points are the same. The second curved surface 22 is attached to the bending part 12, i.e., the second curved surface 22 is attached to the first bending curved surface 121 of the bending part 12. Therefore, the curvature radius of the second curved surface 22 is the same as the curvature radius of the first bending curved surface 121, the curvature radius of the first curved surface 21 is greater than the curvature radius of the second curved surface 22, the curvature radius of the first curved surface 21 is greater than the curvature radius of the first bending curved surface 121, and the curvature radius of the first curved surface 21 may also be greater than the curvature radius of the second bending curved surface 122.

In addition, in another exemplary embodiment of the present disclosure, the first curved surface 21 may be provided as an elliptic cambered surface, a parabolic cambered surface or the like, i.e., the cross-section of the first curved surface 21 perpendicular to the extension direction (i.e., the directrix) may be an elliptic camber line, a parabola or the like. Similarly, the second curved surface 22 may also be provided as an elliptic cambered surface, a parabolic cambered surface or the like, i.e., the cross-section of the second curved surface 22 perpendicular to the extension direction (i.e., the directrix) may be an elliptic camber line, a parabola, or the like. However, since the second curved surface 22 needs to be attached to the first bending curved surface 121, the shapes of the second curved surface 22 and the first bending curved surface 121 are the same.

It should be noted that, the shape of the first curved surface 21 is not limited by the second curved surface 22, the first bending curved surface 121 and the second bending curved surface 122. For example, in the case where the first curved surface 21 is a circular cambered surface, the second curved surface 22, first bending curved surface 121 and second bending curved surface 122 may be circular cambered surfaces, elliptic cambered surfaces, parabolic cambered surfaces or the like. In the case where the first curved surface 21 is an elliptic cambered surface, the second curved surface 22, first bending curved surface 121, and second bending curved surface 122 may still be circular cambered surfaces, elliptic cambered surfaces, parabolic cambered surfaces, or the like.

On the cross-section perpendicular to the extension direction, the middle portion of the padding part 2 is provided opposite to the middle portion of the bending part 12, so that the middle portion of the bending part 12 is padded with the middle portion of the padding part 2, and the edge portion of the bending part 12 is padded with the edge portion of the padding part 2, and after the padding of the padding part 2, the first curved surface 21 attached to the display assembly is made relatively gentle, which facilitates the attachment of the display assembly and avoids the subsequent poor display. The padding part 2 may be divided into three portions. The two portions on both sides are edge portions, and each edge portion is about 30% of the whole padding part 2. The portion between the two edge portions is the middle portion, and the middle portion is about 40% of the whole padding part 2. Similarly, the bending part 12 may be divided into three portions. The two portions on both sides (i.e., connected with the planar part 11 and the extended planar part 13) are edge portions, and each edge portion is about 30% of the whole bending part 12. The portion between the two edge portions is the middle portion, and the middle portion is about 40% of the whole bending part 12.

Referring to FIG. 2, on the cross-section perpendicular to the extension direction, two ends of a first curve of the padding part 2 on the first curved surface 21 are correspondingly connected with two ends of a second curve of the padding part 2 on the second curved surface 22, so that the first curved surface 21 and the second curved surface 22 are connected to form two first edge straight lines 25, and the extension directions of the first edge straight lines 25 are consistent with the extension direction of the padding part 2.

The orthographic projection of one of the first edge straight lines 25 (i.e., attached to the planar part 11) on the planar part 11 of the cover plate 1 coincides with a first connection line 14 of the planar part 11 and the bending part 12, or is located within the planar part 11. The orthographic projection of the other of the first edge straight lines 25 (i.e., attached to the extended planar part 13) on the extended planar part 13 of the cover plate 1 coincides with a second connection line 15 of the extended planar part 13 and the bending part 12, or is located within the extended planar part 13.

In an exemplary embodiment, the padding part 2 further has a first plane 23 and a second plane 24 oppositely provided. Two opposite edges of the first curved surface 21 having extension directions consistent with the extension direction of the bending part 12 and two opposite edges of the second curved surface 22 having extension directions consistent with the extension direction of the ending portion 12 are connected as two first edge straight lines 25. The first plane 23 and the second plane 24 are connected correspondingly to the other two opposite edges of the first curved surface 21 and the other two opposite edges of the second curved surface 22, i.e., the first plane 23 is perpendicular to the extension direction of the bending part 12, and the second plane 24 is perpendicular to the extension direction of the bending part 12. In addition, in another exemplary embodiment of the present disclosure, it may not be a plane but a curved surface that connects the first curved surface 21 and the second curved surface 22 in the direction perpendicular to the extension direction of the bending part 12, as long as it can match with other parts of the display device.

In addition, in another exemplary embodiments of the present disclosure, the padding part 2 may be integrally provided with the cover plate 1, such that the material of the padding part 2 and the material of the cover plate 1 may be the same.

In an exemplary embodiment, the display assembly may include a first adhesive layer 3, a polarizer 4, a display substrate 5, a heat dissipation film 6 and the like. The first adhesive layer 3 is provided at a side of the padding part 2 away from the cover plate 1 and a side of the cover plate 1 on which the padding part 2 is provided; the polarizer 4 is provided at a side of the first adhesive layer 3 away from the cover plate 1; the display substrate 5 is provided at a side of the polarizer 4 away from the cover plate 1; and the heat dissipation film 6 is provided at a side of the display substrate 5 away from the cover plate 1.

The display substrate 5 may be an OLED (OrganicElectroluminesence Display) display substrate, or a QLED (Quantum Dot Light Emitting Diode) display substrate, and the specific structure of the display substrate 5 is not elaborated here. The first adhesive layer 3 may be an optical clear adhesive (OCA) layer. The display substrate 5 may include a display function layer, and may further include a fingerprint recognition function layer, a touch function layer, and the like.

A second adhesive layer may further be provided between the display substrate 5 and the polarizer 4, the display substrate 5 is adhered to the polarizer 4 through the second adhesive layer, and the second adhesive layer may also be an OCA layer. A third adhesive layer may further be provided between the display substrate 5 and the heat dissipation film 6, the display substrate 5 is adhered to the heat dissipation film 6 through the third adhesive layer, and the third adhesive layer may also be an OCA layer.

The preparation process of the padding part 2 may be that viscous OCA is dropped onto the bending inner side of the bending part 12 of the cover plate 1, then the OCA is pressed through a roller to make the OCA form a required shape of the padding part 2, and at this time, the OCA is not yet completely cured. The preparation process of the padding part 2 may also be that, the padding part 2 is prepared according to the designed size, at this time, the OCA of the padding part 2 is not completely cured, and then the padding part 2 is attached to the bending inner side of the bending part 12 of the cover plate 1.

The preparation process of the display panel is that, the respective film layers of the display assembly are attached to the uncured padding part 2, and the OCA is cured through ultraviolet irradiation.

Further, an embodiment of the present disclosure further provides a display device, and the display device may include the any display panel described above. The specific structure of the display panel has been described in detail above, which is not elaborated herein.

The specific type of the display device is not particularly limited, and any type of display device commonly used in the art may be possible, specifically, for example, mobile devices such as mobile phones, wearable devices such as watches, VR devices. Those skilled in the art may make selection correspondingly according to the specific uses of the display device, which is not be elaborated here.

It should be noted that, in addition to the display panel, the display device further includes other necessary components and constituents. By taking a mobile phone as example, specifically, it may further include a housing, a circuit board, a power cord and the like. Those skilled in the art may make corresponding supplements according to the specific use requirements of the display device, which is not be elaborated here.

Compared with the prior art, the beneficial effects of the display device provided by the exemplary embodiments of the present disclosure are the same as the beneficial effects of the display panel provided by the foregoing exemplary embodiments, which is not elaborated here.

Other embodiments of the present disclosure will readily occur to those skilled in the art upon consideration of the description and practice of the present disclosure disclosed here. The present application is intended to cover any variations, uses, or adaptations of the present disclosure that follow the general principles of the present disclosure and include common knowledge or conventional technical means in the technical field not disclosed by the present disclosure. The description and embodiments are to be regarded as exemplary only, and the true scope and spirit of the present disclosure are indicated by the appended claims.

What is claimed is:

1. A display panel, comprising:
a cover plate, having a bending part, a planar part and an extended planar part, and the planar part and the extended planar part being smoothly transitionally connected to two opposite sides of the bending part;
a padding part, provided at a bending inner side of the bending part, wherein an extension direction of the padding part is consistent with an extension direction of the bending part, a sectional shape of the padding part perpendicular to the extension direction is provided as a structure gradually thickening from both side edges to a center portion, the padding part has a first curved surface and a second curved surface, the first curved surface is a cylindrical surface, the first curved surface is a surface of the padding part away from the cover plate, the first curved surface is concave toward the bending part, and at two opposite edges of the first curved surface, the first curved surface smoothly transits to the planar part and the extended planar part respectively, and at one edge of the two opposite edges of the first curved surface, the first curved surface meets the planar part, the second curved surface is provided opposite to the first curved surface and is attached onto the bending part; and
a display assembly, provided at a side of the first curved surface away from the cover plate,
wherein a material of the padding part is optical clear adhesive (OCA) and is different from a material of the cover plate, and the OCA has a transmittance greater than or equal to 90%, a dielectric constant greater than or equal to 4, and an elasticity modulus greater than or equal to 100 KPa and less than or equal to 150 KPa,
wherein the display assembly comprises a first adhesive layer provided at a side of the padding part away from the cover plate, and the first adhesive layer is a separate part from the padding part, the padding part is an adhesive part which is a separate part from the cover plate and is adhered to the first adhesive layer of the display assembly and the cover plate, and the first adhesive layer is further adhered to the planar part of the cover plate.

2. The display panel according to claim 1, wherein on a cross-section perpendicular to the extension direction, a middle portion of the padding part is provided opposite to a middle portion of the bending part.

3. The display panel according to claim 1, wherein a maximum thickness of a middle portion of a cross-section of the padding part perpendicular to the extension direction is greater than or equal to 0.2 millimeters and is less than or equal to 0.5 millimeters, and thicknesses of the cross-section at both side edges of the cross-section are less than or equal to 0.1 millimeters.

4. The display panel according to claim 1, wherein a maximum thickness of a middle portion of a cross-section of the padding part perpendicular to the extension direction is greater than 0.1 millimeters and is less than or equal to 0.16 millimeters, and thicknesses of the cross-section at both side edges of the cross-section are less than 0.1 millimeters.

5. The display panel according claim 1, wherein on a cross-section perpendicular to the extension direction, two ends of a first curve of the padding part on the first curved surface are correspondingly connected to two ends of a second curve of the padding part on the second curved surface, so that the first curved surface and the second curved surface are connected to form two first edge straight lines, and extension directions of the first edge straight lines are consistent with the extension direction of the padding part.

6. The display panel according to claim 5, wherein an orthographic projection of one of the first edge straight lines on the planar part coincides with a first connection line of the planar part and the bending part, or is located within the planar part; and an orthographic projection of the other of the first edge straight lines on the extended planar part coincides with a second connection line of the extended planar part and the bending part, or is located within the extended planar part.

7. The display panel according to claim 1, wherein on a cross-section perpendicular to the extension direction, a curvature radius of the first curved surface gradually increases from both side edges to a center portion of the first curved surface, and a curvature radius of the second curved surface gradually increases from both side edges to a center portion of the second curved surface.

8. The display panel according to claim 1, wherein the display assembly further comprises:
a polarizer, provided at a side of the first adhesive layer away from the cover plate;
a display substrate, provided at a side of the polarizer away from the cover plate; and
a heat dissipation film, provided at a side of the display substrate away from the cover plate.

9. The display panel according to claim 1, wherein a bending angle of the cover plate is greater than or equal to 80°.

10. A display device, comprising a display panel, wherein the display panel comprises:
a cover plate, having a bending part, a planar part and an extended planar part, and the planar part and the extended planar part being smoothly transitionally connected to two opposite sides of the bending part;

a padding part, provided at a bending inner side of the bending part, wherein an extension direction of the padding part is consistent with an extension direction of the bending part, a sectional shape of the padding part perpendicular to the extension direction is provided as a structure gradually thickening from both side edges to a center portion, the padding part has a first curved surface and a second curved surface, the first curved surface is a cylindrical surface, the first curved surface is a surface of the padding part away from the cover plate, the first curved surface is concave toward the bending part, and at two opposite edges of the first curved surface, the first curved surface smoothly transits to the planar part and the extended planar part respectively, and at one edge of the two opposite edges of the first curved surface, the first curved surface meets the planar part, the second curved surface is provided opposite to the first curved surface and is attached onto the bending part; and a display assembly, provided at a side of the first curved surface away from the cover plate, wherein a material of the padding part is optical clear adhesive (OCA) and is different from a material of the cover plate, and the OCA has a transmittance greater than or equal to 90%, a dielectric constant greater than or equal to 4, and an elasticity modulus greater than or equal to 100 KPa and less than or equal to 150 KPa, wherein the display assembly comprises a first adhesive layer provided at a side of the padding part away from the cover plate, and the first adhesive layer is a separate part from the padding part, the padding part is an adhesive part which is a separate part from the cover plate and is adhered to the first adhesive layer of the display assembly and the cover plate, and the first adhesive layer is further adhered to the planar part of the cover plate.

11. The display device according to claim 10, wherein on a cross-section perpendicular to the extension direction, a middle portion of the padding part is provided opposite to a middle portion of the bending part.

12. The display device according to claim 10, wherein a maximum thickness of a middle portion of a cross-section of the padding part perpendicular to the extension direction is greater than or equal to 0.2 millimeters and is less than or equal to 0.5 millimeters, and thicknesses of the cross-section at both side edges of the cross-section are less than or equal to 0.1 millimeters.

13. The display device according to claim 10, wherein a maximum thickness of a middle portion of a cross-section of the padding part perpendicular to the extension direction is greater than 0.1 millimeters and is less than or equal to 0.16 millimeters, and thicknesses of the cross-section at both side edges of the cross-section are less than 0.1 millimeters.

14. The display device according claim 10, wherein on a cross-section perpendicular to the extension direction, two ends of a first curve of the padding part on the first curved surface are correspondingly connected to two ends of a second curve of the padding part on the second curved surface, so that the first curved surface and the second curved surface are connected to form two first edge straight lines, and extension directions of the first edge straight lines are consistent with the extension direction of the padding part.

15. The display device according to claim 14, wherein an orthographic projection of one of the first edge straight lines on the planar part coincides with a first connection line of the planar part and the bending part, or is located within the planar part; and an orthographic projection of the other of the first edge straight lines on the extended planar part coincides with a second connection line of the extended planar part and the bending part, or is located within the extended planar part.

16. The display device according to claim 10, wherein on a cross-section perpendicular to the extension direction, a curvature radius of the first curved surface gradually increases from both side edges to a center portion of the first curved surface, and a curvature radius of the second curved surface gradually increases from both side edges to a center portion of the second curved surface.

* * * * *